United States Patent
Heinonen et al.

[19]

[11] Patent Number: 5,857,151
[45] Date of Patent: Jan. 5, 1999

[54] RADIO UNIT FOR A TELEPHONE SET WITH AUTOMATIC ADJUSTMENT OF OPERATING PARAMETERS BASED ON A CONNECTED POWER MODULE

[75] Inventors: Ari Heinonen, Paimio; Ari-Pekka Lajunen, Salo; Kalevi Malmi, Salo; Jorma Virkkunen, Salo, all of Finland

[73] Assignee: Nokia Mobile Phones Ltd., Salo, Finland

[21] Appl. No.: 161,507

[22] Filed: Dec. 2, 1993

Related U.S. Application Data

[63] Continuation-in-part of Ser. No. 694,978, May 3, 1991, abandoned.

[30] Foreign Application Priority Data

May 4, 1990 [FI] Finland ..................................... 902262

[51] Int. Cl.[6] ................................................. H04B 1/08
[52] U.S. Cl. ............................ 455/349; 455/89; 455/351; 379/58
[58] Field of Search ................................ 455/349, 89, 90, 455/127, 128, 343, 346, 348, 351, 226.1, 355, 352.3; 379/58, 61

[56] References Cited

U.S. PATENT DOCUMENTS

| | | | |
|---|---|---|---|
| 4,593,409 | 6/1986 | Miller | 455/349 |
| 4,673,861 | 6/1987 | Dubovsky et al. | 455/89 |
| 4,897,727 | 1/1990 | Richards | 455/352 X |
| 4,977,609 | 12/1990 | McClure | 455/89 |
| 5,036,532 | 7/1991 | Metroka et al. | 455/89 X |
| 5,164,652 | 11/1992 | Johson et al. | 455/226.1 X |
| 5,170,499 | 12/1992 | Grothause | 455/355 X |

*Primary Examiner*—Curtis Kuntz
*Assistant Examiner*—Philip J. Sobutka
*Attorney, Agent, or Firm*—Darby & Darby

[57] ABSTRACT

A radio unit of a radio telephone set is provided with current input connections comprising separate identification inputs through which is indicated the type of phone module, and internal or external power supply thereof, which is connected to the radio unit. A control element in the radio unit is programmed to adjust the operating parameters of the radio unit in accordance with the type of phone module which is connected.

5 Claims, 2 Drawing Sheets

RADIO UNIT FOR A TELEPHONE SET WITH AUTOMATIC ADJUSTMENT OF OPERATING PARAMETERS BASED ON A CONNECTED POWER MODULE

This is a continuation-in-part, of application Ser. No. 07/694,978, filed May 3, 1991, now abandoned.

BACKGROUND OF THE INVENTION

The invention relates to a radio unit for a radio telephone set wherein said radio unit is interconnected with at least one disconnectable phone module.

Cellular or mobile phones are, for various uses, comprised of different combinations of a radio unit and a phone module. A mobile phone, a portable phone, a hand-portable phone and a mobile phone with a separate battery, for example, are involved. A mobile phone with a separate battery is called a bag phone. In certain types of telephones a number of similar batteries with similar voltage limits can be used. The prior art radio telephone can also identify the difference in whether the phone element uses its own battery or if the phone is fed by an external power supply.

Patent application EP 90304320.6. published on Oct. 24, 1990 with the number 394074 discloses a method and apparatus for determining the battery type and for modifying operating characteristics accordingly.

The diversity of different combinations, as well as the costs entailed with short production runs and a larger number of production lines, respectively, are drawbacks in the present cellular phone production.

SUMMARY OF THE INVENTION

Bearing this in mind, the present invention goes further with respect to the above mentioned EP specification, more particularly with the aim of identifying not merely the battery type but the type of module connected to the central radio unit.

According to the invention, the same radio unit and the related software can be used in connection with different types of cellular phones. The radio unit identifies in conjunction with start-up what kind of phone is connected thereto at any given time. Based on this definition carried out preferably by a microprocessor program of the radio unit, the radio unit selects an appropriate operating state and appropriate user features, such as the selection of radio power, deep discharge characteristics of the battery, illumination of the telephone display and keyboard, automatic power switch-off, etc.

The invention makes it possible to produce a single common radio unit for different types of phones, thereby decreasing the production costs as a result of longer production runs and a smaller number of production lines.

Different types of batteries, such as NiCd and lead gelatin accumulators with diverging allowable voltage limits, can, depending on the case, be coupled to the same radio unit by the method according to the invention. The voltage limits and the user features of different types of batteries are preferably specified in the software.

BRIEF DESCRIPTION OF THE DRAWINGS

The invention will be described in greater detail in the following portion of the specification using an.

Exemplary embodiment with reference to the appended drawings, wherein.

DESCRIPTION OF A PREFERRED EMBODIMENT

The figure illustrates only those radio telephone elements which are essential from the point of view of the invention. A cellular radio telephone is used as an example here. According to the invention, a radio unit 10 is provided with current feed connections 12 and 13, which, respectively, comprise connections to a supply voltage (+) and to a ground (−), and an identification connection s1, s2.

The radio unit is further provided with an analog/digital converter 11, which converts analog signals S1, S2, that is, identification inputs, into a respective digital signal, which is conducted to a microprocessor unit 36 controlling the radio telephone. It is assumed that the rest of the cellular phone elements are familiar to professionals in the field, and have thus not been explained here in more detail.

An interface where, depending on the situation, a different telephone module is coupled to the radio unit 10 in accordance with the invention is illustrated in the figure with a vertical dashed line. On the right in FIG. 1, alternative phone modules are shown, essentially only by means of the current input elements thereof.

Figure 1:
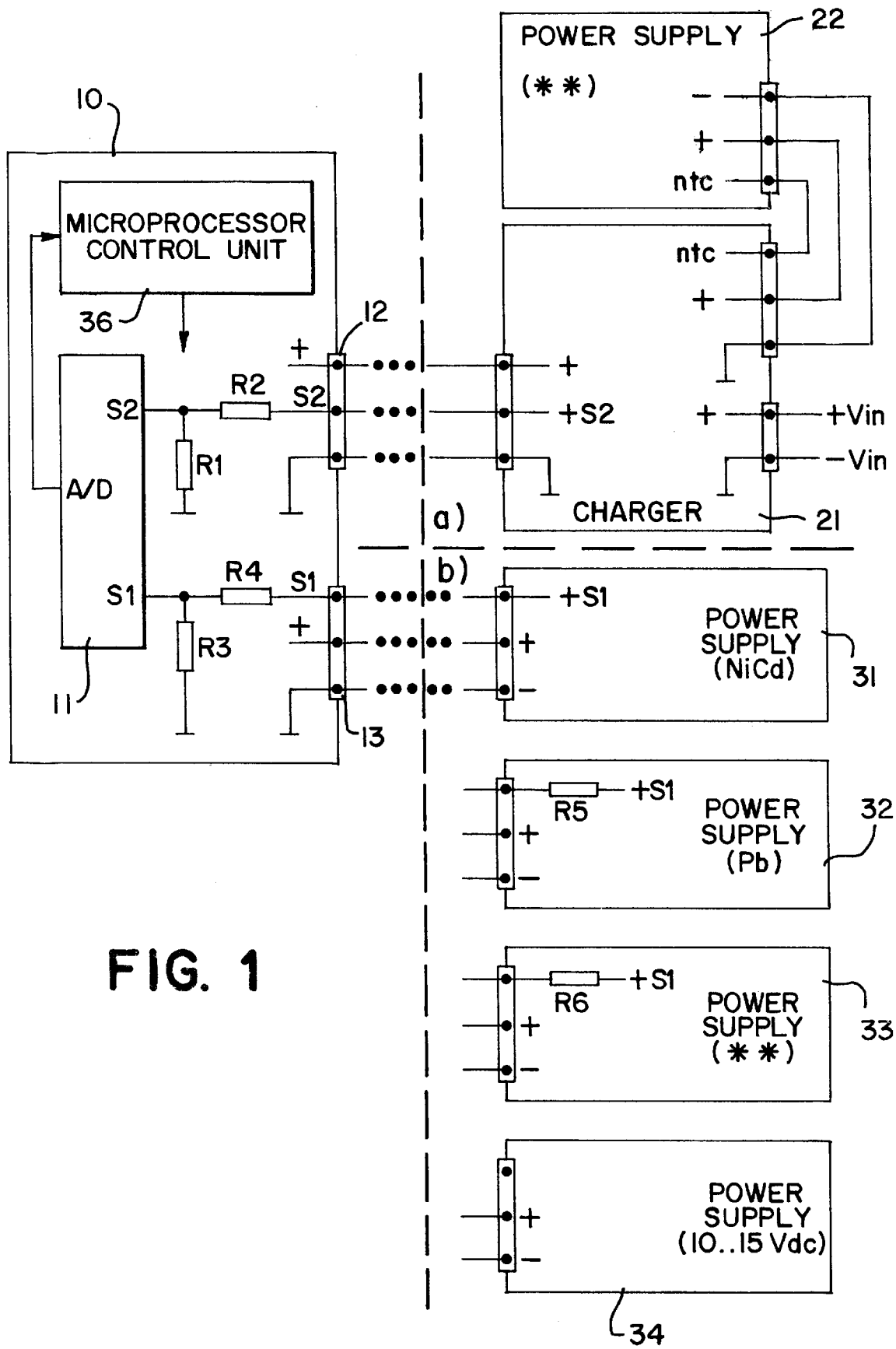
FIG. 1 is a functional block drawing of FIG. 1 illustrating a radio unit and current feed elements for the phone elements which alternatively may be connected thereto.

In section a) of FIG. 1, current input element, that is a charger unit 21 is shown, which operates from an internal power supply 22, for example a NiCd accumulator, of a telephone. An external current input connection (+Vin/−Vin) can be coupled to the charger unit 21. Such a unit 21, 22 can be used in a portable phone, where the current input is connected from the battery/charger unit 22, 21 to connection 12 of the radio unit 10. The connection 12 also has an identification line s2. An identification signal S2 from the charger 21 joins to line s2 at connection 12. S2 is in this case the supply voltage (+).

In section b) of FIG. 1 there are phone modules which use an external power supply of the phone, for example in a mobile phone or a bag phone. Of these, unit 34 which is a separate power supply of 10 . . . 15 V, is coupled in the same manner as units 31–33 to the connection 13 of the radio unit 10.

The current input units 31–33 include e.g. different batteries, from which an identification signal S1 is conducted, depending on the case, to connection 13 either directly from the supply voltage, or via a resistor R5, R6. Unit 31 contains a NiCd accumulator, unit 32 contains a lead gelatin accumulator, and unit 33 has an optional accumulator/battery alternative indicated by the symbol (\*\*).

Identification signal S1 and S2 are conducted from identification lines s1, s2 of connections 12, 13, to the A/D converter 11, by which the radio unit identifies the kind of cellular phone it is operating in. This example comprises two connections arranged thereto, whereby identification lines s1, s2 can be aligned to sensitivities corresponding to different current input groups a) and b).

The user features and operating parameters or operating states associated with the phone and battery types have been preprogrammed into the memory of the microprocessor control unit 36 in the radio unit 10. The selection of radio power, the deep discharge characteristic of the battery, illumination of the display and keyboard (on-/off), automatic power switch-off, etc. are examples of possible user features.

Figure 2:
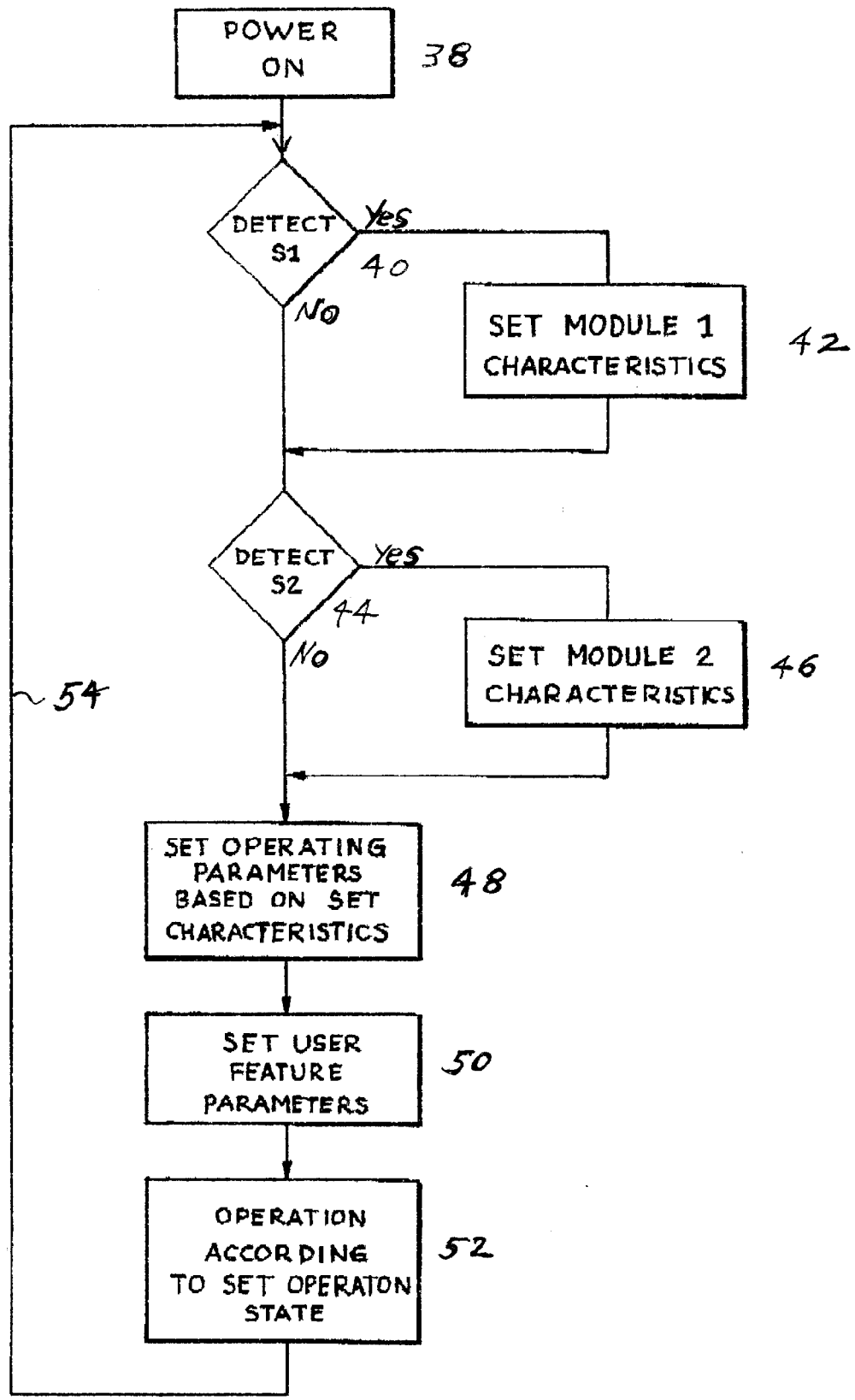
FIG. 2 is a flow chart for the selection of operating parameters and user features by the radio unit of FIG. 1.

FIG. 2 is an exemplary flow chart for operation of the microprocessor control unit 36 in setting the operating parameters and user features of the radio unit 10. When the radio telephone set is in operation, the computer 36 continuously or at predetermined intervals carries out the steps of operation to determine the nature of the phone module connected to the radio unit 10. If the phone module connected to the radio unit 10 is changed, the computer will detect this change and reset, as necessary, the operating parameters and user features of the radio unit in its next cycle of operation. If the radio unit has been off and is now powered, the power ON condition initiates the control cycle to determine the proper operating parameters and user features.

Assuming that a phone module has been selected and connected to the radio unit 10 while the power is off, and the power is turned on as indicated in FIG. 2 at 38, the microprocessor 36 then detects, at 40, whether a voltage signal is present at terminal s1. If a signal is present at s1, then the microprocessor, using data stored in its memory, sets the operating parameters and user features in accordance with the value of s1 that has been detected. Using FIG. 1 as an example, the computer will set user features for the individual module 31-34 that has been selected and connected.

Next the microprocessor 36 checks for a signal at s2 (44). If a value of S1 has been detected and no module is connected at connection 12 then at s2 there will not be a signal, and the routine will proceed to set the operating parameters based on s1. If there is no signal at s1, the setting step (42) is bypassed and at step 44 the s2 signal is detected. However, if modules are connected at connections 12 and 13. signals s2 and s1 will be detected and evaluated by the microprocessor 36. This causes the module operating characteristics to be set at 46.

Once the characteristics are set based on s1 or s2, the radio unit is set, at 48, for the operating parameters of the particular module that provided the signal s1. The user features are then selected (50) from computer memory for that same module. Thereby, the radio unit 10 operates (52) with the proper operating parameters and user features. Now that the telephone set is in operation, the computer cycle loops back, at 54, and repeats the process of detecting whether there is a signal at s1 or at s2. If the module has changed so that there is a change in s1 or s2, the operating parameters and user features are changed, as required to accommodate the presently connected module, in the next computer cycle.

The battery types and the corresponding voltage limits in question are preferably fed to the memory of the radio unit, in a construction as described whereby the implementation is simple. The battery types and the corresponding voltage limits can alternatively be fed into the radio unit via a keyboard (not shown ) of the radio telephone set (e.g. of the user part of a hand phone), or afterwards via a separate external device.

According to the construction of the invention, a radio telephone which simplifies the manufacture of radio phones is provided. In addition, maintenance becomes simpler and it is easier for maintenance personnel to learn to know the set, because the number of different assemblies decreases.

We claim:

1. A radio unit for a radio telephone set, in said radio telephone set said radio unit is connectable with at least two disconnectable phone modules and has different appropriate operating states, wherein the radio unit (10) comprises at least two current input connections which are each simultaneously electrically connected to a respective identification line from a corresponding connected phone module, an analog signal from said phone module on each said identification line identifying the interconnected phone module and the current supply unit (21, 34; 31–33) thereof, the first of said current input connections for connection to a phone module provided with an external power supply, the second of said current input connections for connection to a phone module provided with an internal power supply and the radio unit having a control element for automatically and repeatedly adjusting selected operating parameters and user features of the radio unit for operation in a respectively appropriate operating state for said interconnected module or modules according to repeated determination of a digital code corresponding to the analog identification signals, the radio unit, when connected, being operable in a respectively appropriate operating state when connected with said phone module or modules.

2. A radio unit according to claim 1, wherein the radio unit is provided with an A/D converter (11) for processing the signals of the identification inputs (s1; s2), said signals thereafter being conducted to a microprocessor based control element.

3. A radio unit for a radio telephone set, said radio telephone set including at least a first disconnectable phone module having a first type of power supply and a second disconnectable phone module having a second type of power supply for operation individually with said radio unit, each said phone module being compatible for alternative operation in a respectively appropriate operating state with said radio unit, comprising:

at least two current input connections which are each simultaneously electrically connected to a respective identification line from a corresponding connected phone module;

the first of said current input connections on said radio unit for releasible engagement with a respective connection on said first phone module, the first of said current input connections including a first identification line that engages a phone module identification line carrying a first analog signal identifying the first phone module by its operating characteristics when said first phone module engages said radio unit;

the second of said current input connections on said radio unit for releasible engagement with a respective connection on said second phone module, the second of said current input connections including a second identification line that engages a phone module identification line carrying a second analog signal identifying the second phone module by its operating characteristics when said second phone module engages said radio unit;

a control unit in said radio unit for receiving at least one of said first and second analog identifying signals via said radio unit identification line and outputting digital control signals corresponding to said analog identification signals for automatically and repeatedly adjusting selected operating parameters and user features of said radio unit to a respectively appropriate state to correspond to the existing combination of radio unit and a connected phone module or modules based on repeated determination of the phone module identifying signals, the radio unit, when connected, being operable in a respectively appropriate operating state when connected with said phone module or modules.

4. A radio unit as in claim 3, further comprising an analog to digital converter for processing said identifying signals to the form of digital signals, and a microprocessor-based control element receiving said digital signals and generating control signals for selecting said operating parameters of the radio unit.

5. A radio unit as in claim 3, wherein said first type of power supply is external and said second type of power supply is internal.

* * * * *